(12) United States Patent
Koga

(10) Patent No.: US 8,451,471 B2
(45) Date of Patent: *May 28, 2013

(54) IMAGE FORMING APPARATUS, POWER SAVING CONTROL METHOD, AND COMPUTER-READABLE RECORDING MEDIUM HAVING RECORDED THEREIN POWER SAVING CONTROL PROGRAM

(75) Inventor: Masaru Koga, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 530 days.

This patent is subject to a terminal disclaimer.

(21) Appl. No.: 12/754,788

(22) Filed: Apr. 6, 2010

(65) Prior Publication Data

US 2010/0257394 A1    Oct. 7, 2010

Related U.S. Application Data

(60) Provisional application No. 61/167,208, filed on Apr. 7, 2009, provisional application No. 61/169,447, filed on Apr. 15, 2009.

(51) Int. Cl.
 *G06F 15/00* (2006.01)
 *G06K 1/00* (2006.01)
(52) U.S. Cl.
 USPC .......... 358/1.14; 358/1.9; 358/1.13; 358/1.15
(58) Field of Classification Search
 None
 See application file for complete search history.

(56) References Cited

U.S. PATENT DOCUMENTS 6,081,663 A    6/2000  Takahashi et al.
2007/0097424 A1    5/2007  Mizuno

FOREIGN PATENT DOCUMENTS

| JP | 2001075687 | 3/2001 |
| JP | 2005335255 | 12/2005 |
| JP | 2007102574 | 4/2007 |
| JP | 2008305209 | 12/2008 |
| JP | 2009093432 | 4/2009 |

*Primary Examiner* — Thierry Pham
(74) *Attorney, Agent, or Firm* — Turocy & Watson, LLP

(57) ABSTRACT

An image forming apparatus includes: a power-saving-mode determining unit configured to determine, on the basis of at least an operation state of a processor, to which power saving mode of a sleep mode in which power supply to at least a fixing device is stopped and a super sleep mode in which a power supply for the processor is turned off and power consumption is lower than that in the sleep mode the image forming apparatus transitions. The power-saving mode determining unit performs the determination if predetermined processing is not executed for time set in advance or if an instruction for executing transition processing to a power saving mode in which power consumption is lower than that in a normal operation mode in which power supply to at least the fixing device is performed is received; and a power-saving-mode control unit configured to execute, on the basis of a determination result of the power-saving-mode determining unit, processing for transition to one power saving mode of the sleep mode and the super sleep mode.

20 Claims, 6 Drawing Sheets

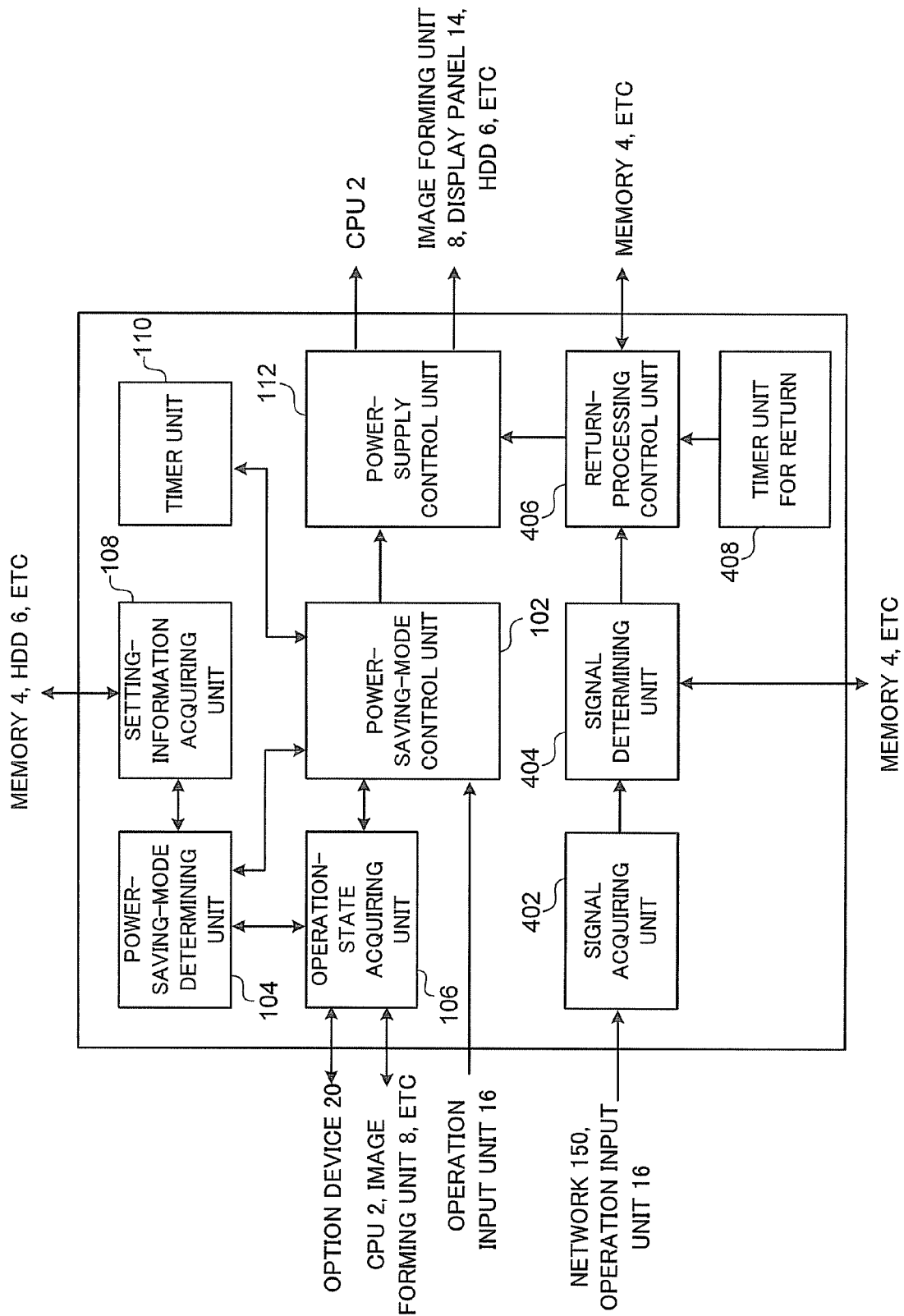

FIG.5

| Protocol | Details | RETURN | PACKET TYPE | NOTE |
|---|---|---|---|---|
| IPP | IPP | Yes | Unicast | TCP |
| FTP | FTP | Yes | Unicast | TCP |
| SNMP | SNMP | Yes | Unicast, Broadcast | UDP |
| HTTP | HTTP (Top Access) | Yes | Unicast | TCP |
| LDAP | LDAP | No | N/A | TCP |
| SASL | KRB | No | N/A | TCP |
| | SASL | No | - | TCP |
| SSL | SSL/TLS | Yes | Unicast | TCP |
| Mail | SMTP Server | Yes | Unicast | TCP |
| | POP | No | N/A | TCP |
| SMB | LANMAN | No | N/A | TCP |
| | NBNS | Yes | Broadcast | UDP |
| | NBSS | No | N/A | — |
| | SMB | Yes | ONLY Unicast | TCP |
| | BROWSER | No | N/A | UDP |
| | NMPI | No | N/A | — |
| | SMB_NETLOGON | No | N/A | TCP |
| Bonjour(Rendezvous) | | Yes | Multicast | UDP |
| AppleTalk | AARP | No | N/A | — |
| | PAP (ATP,ASP) | No | N/A | — |
| | NBP | No | N/A | — |
| | RTMP | No | N/A | — |
| | ZIP | No | N/A | — |
| IPX | IPX-RIP | No | N/A | — |
| | IPX-SAP | No | N/A | — |
| | NBIPX | No | N/A | — |
| | NCP | No | N/A | — |
| Raw9100 | RAW 9100 Print | Yes | Unicast | TCP |
| LPD | LPD | Yes | Unicast | TCP |
| DNS/DDNS | DNS | No | N/A | UDP |
| | MDNS | No | N/A | UDP |
| LLMNR | Link Local Name Resolution | Yes | Multicast | UDP |
| DHCP | DHCP | No | N/A | UDP |
| DHCPv6 | DHCPv6 | No | N/A | UDP |
| SNTP | | No | N/A | UDP |
| DPWS | Discovery | Yes | Multicast | UDP |
| | Metadata | No | N/A | TCP |
| | Print | Yes | Unicast | TCP |
| | Scan | Yes | Unicast | TCP |
| | Eventing | No | N/A | TCP |
| Probetask | ICMPv6 | No | N/A | — |
| Neighbor Discovery | ICMPv6 | Yes | Multicast | — |
| IPsec | AH | Yes | Unicast | — |
| | ESP | Yes | Unicast | — |
| | IKE v1 and v2 | Yes | Unicast | — |
| 802.1x | | No | N/A | — |
| ICMPv4 | | Yes | ONLY Unicast | — |
| ARP | Address resolution Protocol | Yes | Multicast, Broadcast | — |
| SLP | Service Location Protocol | Yes | Multicast | UDP |
| LLTD | Link Layer Topology Discovery | Yes | Multicast | — |
| SCEP | Simple Certificate Enrollment Protocol | No | N/A | UDP |

IMAGE FORMING APPARATUS, POWER SAVING CONTROL METHOD, AND COMPUTER-READABLE RECORDING MEDIUM HAVING RECORDED THEREIN POWER SAVING CONTROL PROGRAM

CROSS-REFERENCE TO RELATED APPLICATION

This application is based upon and claims the benefit of priority from: U.S. provisional application 61/167,208, filed on Apr. 7, 2009; and U.S. provisional application 61/169,447, filed on Apr. 15, 2009; the entire contents of each of which are incorporated herein by reference.

TECHNICAL FIELD

This specification relates to a power saving control technique for an image forming apparatus, and, more particularly to processing for controlling return from a power saving state.

BACKGROUND

In the past, in an image forming apparatus such as a MFP (Multi Function Peripheral), if an image forming (printing) job, an operation input signal, or the like is not acquired for fixed time, control for transition to an operation mode in a power saving state in which a power supply for an image forming unit or the like including a fixing device is off, i.e., a sleep mode is performed.

However, in the sleep mode of the MFP in the past, although power supplies for the image forming unit, a display panel, and the like are turned off, processing for turning off a power supply for a CPU is not performed. This is because, if the power supply for the CPU is turned off, various kinds of processing in the image forming apparatus cannot be executed. For example, when a print job is acquired via a network, print processing cannot be executed if the power supply for the CPU is off.

Therefore, in the past, even in the sleep mode, for example, processing for suppressing power consumption is performed by keeping the power supply for the CPU on as in a normal operation mode or, instead of turning off the power supply, reducing the number of clocks of the CPU.

However, since power consumption of the CPU is relatively large, if the power supply for the CPU is kept on in the sleep mode, a sufficient power saving effect cannot be obtained. Even if the number of clocks of the CPU is reduced, the sufficient power saving effect cannot be obtained. On the other hand, if the power supply for the CPU is simply turned off, since various kinds of processing cannot be executed, functions of the MFP are limited and convenience of the MFP decreases.

SUMMARY

In order to solve the problems, this specification relates to an image forming apparatus including: a power-saving-mode determining unit configured to determine, on the basis of an operation state of a processor, to which power saving mode of a sleep mode in which power supply to at least a fixing device is stopped and a super sleep mode in which a power supply for the processor is turned off and power consumption is lower than that in the sleep mode the image forming apparatus transitions, the power-saving mode determining unit performing the determination if predetermined processing is not executed for time set in advance or if an instruction for executing transition processing to a power saving mode in which power consumption is lower than that in a normal operation mode in which power supply to at least the fixing device is performed is received; and a power-saving-mode control unit configured to execute, on the basis of a determination result of the power-saving-mode determining unit, processing for transition to one power saving mode of the sleep mode and the super sleep mode.

This specification relates to a power saving control method including: determining, on the basis of an operation state of a processor, to which power saving mode of a sleep mode in which power supply to at least a fixing device is stopped and a super sleep mode in which a power supply for the processor is turned off and power consumption is lower than that in the sleep mode an image forming apparatus transitions, the determination being performed if predetermined processing is not executed for time set in advance or if an instruction for executing transition processing to a power saving mode in which power consumption is lower than that in a normal operation mode in which power supply to at least the fixing device is performed is received; and executing, on the basis of a determination result of the determination, processing for transition to one power saving mode of the sleep mode and the super sleep mode.

This specification relates to a computer-readable recording medium having recorded therein a power saving control program for causing a computer to execute processing for acquiring power saving mode setting information for designating to which power saving mode of a sleep mode in which power supply to at least the fixing device is stopped and a super sleep mode in which a power supply for a processor is turned off and power consumption is lower than that in the sleep mode an image forming apparatus transitions, the power saving control program causing the computer to execute the processing if it is determined, on the basis of an operation state of a processor, to which power saving mode of the sleep mode and the super sleep mode the image forming apparatus transitions and processing for transition to one power saving mode of the sleep mode and the super sleep mode is executed on the basis of a determination result of the determination, the determination being performed if predetermined processing is not executed for time set in advance or if an instruction for executing transition processing to a power saving mode in which power consumption is lower than that in a normal operation mode in which power supply to at least the fixing device is performed is received.

This specification relates to a computer-readable recording medium having recorded therein a power saving control program for causing a computer to execute processing for acquiring active function setting information concerning whether a function that cannot be executed unless a power supply for a processor is on is activated even in a state in which an image forming apparatus transitions to a mode in which power consumption is lower than that in a normal operation mode in which power supply to at least a fixing device is performed, the power saving control program causing the computer to execute the processing if it is determined, on the basis of an operation state of the processor, to which power saving mode of a sleep mode in which power supply to at least the fixing device is stopped and a super sleep mode in which the power supply for the processor is turned off and power consumption is lower than that in the sleep mode an image forming apparatus transitions and processing for transition to one power saving mode of the sleep mode and the super sleep mode is executed on the basis of a determination result of the determination, the determination being performed if predetermined processing is not executed for time set in advance or if an instruction for executing transition processing to a power saving mode in which power consumption is lower than that in the normal operation mode is received.

DESCRIPTION OF THE DRAWINGS

FIG. 4 is a functional block diagram of a MFP according to a second embodiment of the present invention;

FIG. 5 is a data table in which protocols of signals that can be acquired via a network and return processing designation information indicating whether super sleep is released when the protocols are acquired are associated with each other.

DETAILED DESCRIPTION

Embodiments of the present invention are explained below with reference to the accompanying drawings.

First Embodiment

Figure 1:
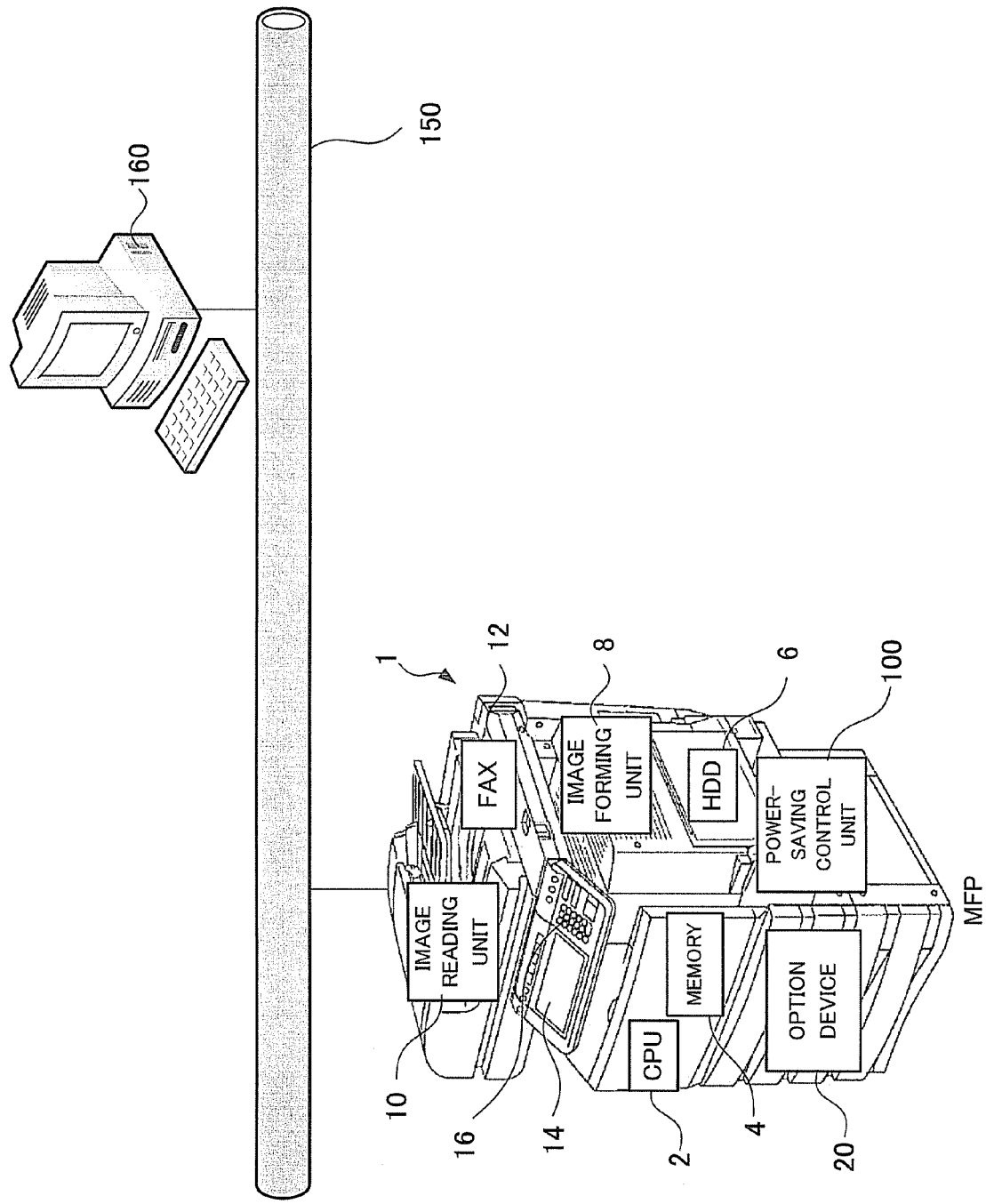
FIG. 1 is a system diagram of the configuration of a MFP (Multi Function Peripheral) as an image forming apparatus according to a first embodiment of the present invention and a system including the MFP.

FIG. 1 is a system diagram of the configuration of a MFP (Multi Function Peripheral) 1 as an image forming apparatus according to a first embodiment of the present invention and a system including the MFP 1. The system according to this embodiment is configured by connecting the MFP 1 and other apparatuses such as a terminal 160 via a network 150. The apparatuses included in the system are explained in detail below.

First, the configuration of the MFP 1 is explained. The MFP 1 includes a CPU 2 as a processor, a memory 4, a HDD (Hard Disc Drive) 6, an image forming unit 8, an image reading unit 10, a facsimile 12, a display panel 14, an operation input unit 16, and a power-saving control unit 100.

The MFP 1 is a MFP having a function of transitioning to a sleep mode or a super sleep mode in which power consumption is lower than that in the sleep mode when predetermined processing such as image forming (printing) processing, image reading (scanning) processing, or processing for acquiring a signal such as an operation input signal or a predetermined communication signal is not executed for time set in advance or when an operation input for instructing transition to a power saving mode such as the sleep mode is received.

In this embodiment, the "sleep mode" refers to an operation mode in which power supply to at least a fixing device is stopped. The "super sleep mode" refers to an operation mode in which a power supply for the CPU 2 is turned off in addition to a state in which the power supply to the fixing device is stopped. In the super sleep mode, power consumption is lower than that in the sleep mode. The operation mode in which power consumption is suppressed such as the sleep mode or the super sleep mode is referred to as power saving mode.

On the other hand, the normal operation mode refers to an operation mode in which electric power is supplied to the fixing device and the CPU. In the normal operation mode, power consumption is higher than that in the power saving mode such as the sleep mode or the super sleep mode. In the case of the normal operation mode, basically, power supplies for other devices included in the MFP 1 such as the HDD 6 and the display panel 14 are also on. All functions of the MFP 1 can be used.

The MFP 1 according to this embodiment determines, on the basis of, for example, an operation state of the CPU 2 and setting concerning functions of the MFP 1, a power saving mode to which the MFP 1 transitions. The MFP 1 has a function of performing, when it is undesirable to transition to the super sleep mode because of an operation state and various settings of the CPU 2, processing for not transitioning to the super sleep mode to thereby realize highly effective power saving operation while preventing necessary functions from being limited.

As the configuration of the MFP 1 for realizing such a function, first, the CPU 2 as a processor executes various kinds of processing in the MFP 1 such as image forming processing and image reading processing on the basis of an image forming job, an operation input, or the like. The CPU 2 can realize various functions including the function by executing computer programs stored in the memory 4.

The memory 4 stores computer programs for executing the image forming processing and the image reading processing. The memory 4 has a function of temporarily storing, for example, a signal of the image forming job acquired via the network 150 and an operation input signal from the operation input unit 16. The memory 4 can include, for example, a RAM (Random Access Memory), a ROM (Read Only Memory), a DRAM (Dynamic Random Access Memory), an SRAM (Static Random Access Memory), or a VRAM (Video RAM).

The HDD 6 is an auxiliary storage device configured to store various kinds of information in the MFP 1. In this embodiment, the HDD is illustrated as the auxiliary storage device of the MFP 1. However, the auxiliary storage device is not limited to this. For example, a flash memory, an SSD (Solid State Drive), or a magnetic disk other than the HDD can also be used.

The image forming unit 8 is a device configured to apply image forming (printing) processing to a sheet such as paper when an image forming job is acquired from the terminal 160 or the like via the network 150 or when an original document is read by the image reading unit 10 and copied. The image forming unit 8 includes a transfer device configured to transfer a toner image onto the sheet and a fixing device configured to fix the transferred toner image on the sheet.

The image reading unit 10 is a general image reading device included in a copying machine, an image scanner, or the like. The image reading unit 10 is used when an original document is copied or scanned by using the MFP 1.

The facsimile 12 is an apparatus configured to transmit and receive facsimile signals in the MFP 1.

The display panel 14 displays various kinds of information such as setting information and an operation state of the MFP 1. The display panel 14 can include, for example, an LCD (Liquid crystal display), an EL (Electronic Luminescence), a PDP (Plasma Display Panel), or a CRT (Cathode Ray Tube). When the display panel 14 includes a touch panel display, the display panel 14 can realize a part or all of functions of the operation input unit 16.

The operation input unit 16 performs operation for inputting instructions for causing the MFP 1 to execute processing such as copying and scanning and inputting conditions for the processing, a facsimile number, and the like. The operation input unit 16 can include, for example, input keys for numbers, a keyboard, a mouse, a touch panel, a touch pad, or a graphics tablet.

The power-saving control unit 100 controls processing for transition to the power saving mode. The power-saving control unit 100 realizes, independently or in cooperation with the CPU 2 or the like, a power saving control function such as processing for transition to the power saving mode executed by the MFP 1 according to this embodiment explained later.

As a system component other than the MFP 1 of the system configuration shown in FIG. 1, the network 150 is a communication network including, for example, the Internet, a LAN (Local Area Network), or a WAN (Wide Area Network).

The terminal 160 connected to the network 150 outputs an image forming job or the like to the MFP 1 via the network 150.

Power saving control processing (method) executed by the MFP 1 according to this embodiment is explained below.

Figure 2:
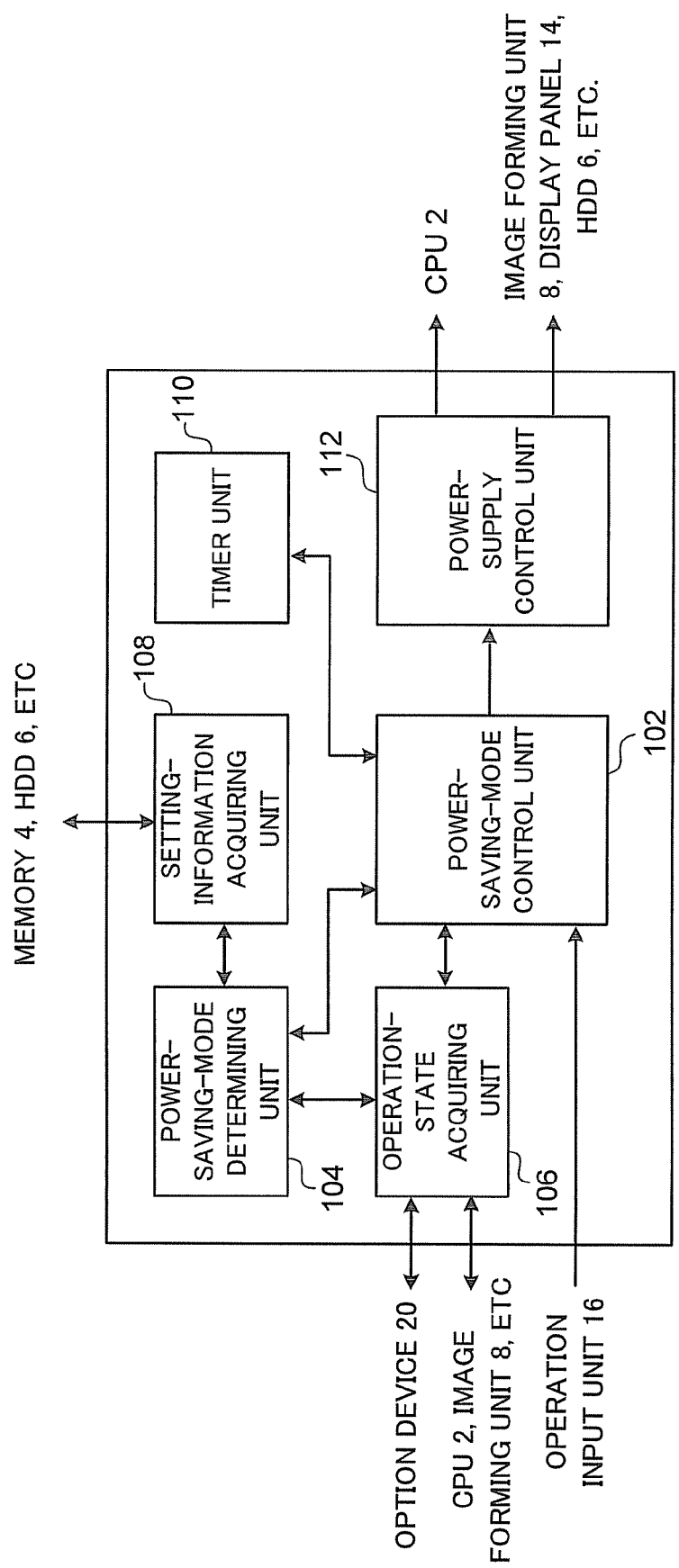
FIG. 2 is a functional block diagram for explaining a power saving control processing function of the MFP according to the first embodiment.

FIG. 2 is a functional block diagram for explaining a power saving control processing function of the MFP 1 according to this embodiment.

The MFP 1 according to this embodiment includes a power-saving-mode control unit 102, a power-saving-mode determining unit 104, an operation-state acquiring unit 106, a setting-information acquiring unit 108, a timer unit 110, and a power-supply control unit 112.

The power-saving-mode control unit 102 executes processing for transition to the power saving mode when power saving mode transition time set in advance elapses in a state in which predetermined processing is not executed or when an instruction for transition to the power saving mode by an operation input from the operation input unit 16 is received. In executing the processing for transition to the power saving mode, the power-saving-mode control unit 102 executes, on the basis of a determination result of the power-saving-mode determining unit 104 based on, for example, an operation state of the CPU 2 and setting information concerning to which power saving mode the MFP 1 transitions, processing for transition to one power saving mode of the sleep mode and the super sleep mode. The predetermined processing is, for example, acquisition of various signals for an image forming job, an operation input, and the like or processing executed in the MFP 1 such as the image forming processing and the image reading processing. Information concerning whether the predetermined processing is executed is acquired from the operation-state acquiring unit 106 configured to acquire operation states of the devices of the MFP 1. Measurement concerning elapse of the power saving mode transition time is performed by a timer unit 110 explained later.

In the power-saving control unit 102 according to this embodiment, when the MFP 1 transitions to the power saving mode, the super sleep mode is designated as the power saving mode in power saving mode setting information explained later. However, the power-saving control unit 102 can turn off, when the CPU 2 is executing processing, while keeping power supplies for the CPU 2 and devices necessary for the processing, power supplies for the other devices (or may transition the MFP 1 to the sleep mode) and execute processing for transition to the super sleep mode when the processing executed by the CPU 2 is completed later. Consequently, the processing by the CPU 2 is executed without being prevented. Further, it is possible to execute, when the processing is completed, processing for promptly transitioning to the power saving mode as initially set.

The power-saving-mode determining unit 104 determines, on the basis of information acquired from the operation-state acquiring unit 106 and information acquired from the setting-information acquiring unit 108, to which power saving mode of the sleep mode and the super sleep mode the MFP 1 transitions. Specifically, the power saving mode determining unit 104 performs, on the basis of the information acquired from the operation-state acquiring unit 106 and the setting-information acquiring unit 108, determination for determining whether it is possible to turn off the power supply for the CPU 2 and determines the power saving mode to which the MFP 1 transitions.

The information acquired from the operation-state acquiring unit 106 includes operation states of the devices such as the CPU 2 and information concerning presence or absence of mounting of an option device 20 such as a radio communication device like a Bluetooth module or a wireless LAN module. The information acquired from the setting-information acquiring unit 108 includes power saving mode setting information for designating to which of the sleep mode and the super sleep mode the MFP 1 transitions when the MFP 1 transitions to the power saving mode and active function setting information for designating whether the functions of the devices of the MFP 1 including the option device 20 are activated even after the transition to the power saving mode.

For example, when the MFP 1 transitions to the power saving mode, the power-saving-mode determining unit 104 acquires, from the setting-information acquiring unit 108, power saving mode setting information indicating that the super sleep mode is designated as the power saving mode and acquires, from the operation-state acquiring unit 106, information concerning an operation state indicating that the CPU 2 is executing no processing. Then, the super sleep mode is designated and the power supply for the CPU 2 can be turned off. Therefore, as the determination processing of the power-saving-mode determining unit 104, the power-saving-mode determining unit 104 determines that the MFP 1 transitions to the super sleep mode.

When the MFP 1 transitions to the power saving mode, the power-saving-mode determining unit 104 acquires, from the operation-state acquiring unit 106, information concerning an operation state indicating that the option device 20 such as the Bluetooth module is mounted. Further, the power-saving-mode determining unit 104 acquires, from the setting-information acquiring unit 108, active function setting information for designating that a function of the option device 20 is activated irrespectively of an operation mode. In this case, since the MFP 1 cannot transition to the super sleep mode for turning off the power supply for the CPU 2, the power-saving mode determining unit 104 determines that the MFP 1 transitions to the sleep mode.

Besides, the power-saving-mode determining unit 104 makes various determinations according to information acquired by the operation-state acquiring unit 106 and the setting-information acquiring unit 108. Details of determination processing are explained later with reference to a flowchart of FIG. 3 that shows a flow of power saving control processing.

The operation-state acquiring unit 106 acquires operation states of the respective devices and functions of the MFP 1 such as the CPU 2 and the image forming unit 8. Specifically, the operation-state acquiring unit 106 monitors whether the CPU 2 is executing processing such as the image forming processing or whether the image forming unit 8 is executing the image forming processing and acquires an operation state. The operation-state acquiring unit 106 also acquires an operation state indicating whether the option device 20 such as a radio communication device like the Bluetooth module or the like is mounted on the MFP 1 and operates.

When the MFP 1 transitions to the power saving mode, the setting-information acquiring unit 108 acquires power saving mode setting information that designates to which of the sleep mode and the super sleep mode the MFP 1 transitions. The setting-information acquiring unit 108 also acquires active function setting information for designating whether the functions of the devices of the MFP 1 including the option device 20 are activated even after transition to the power saving mode. The power saving mode setting information and the active function setting information are set in advance or set by an operation input of a user and stored in the storage device such as the memory 4 or the HDD 6 or a dedicated storage device for storing these kinds of information.

When the predetermined processing such as the image forming processing is not being executed, the timer unit 110 measures time. When power saving mode transition time set in advance elapses, the timer unit 110 outputs a signal indicating that the power saving mode transition time elapses to the power-saving-mode control unit 102.

The power-supply control unit 112 controls power supply to the respective devices of the MFP 1 such as the CPU 2, the image forming unit 8, and the display panel 14. In this embodiment, the power-supply control unit 112 performs, on the basis of an instruction of the power-saving-mode control unit 102, processing for turning off the power supplies for the devices such as the CPU 2 and the image forming unit 8.

Functional blocks included in the MFP 1 according to this embodiment are explained above. These functional blocks can be realized by circuits such as an ASIC included in the power-saving control unit 100. The functional blocks may be realized by combinations of functions realized by the CPU 2 executing computer programs and the circuits.

With the MFP 1 including the components explained above, when the MFP 1 transitions to the power saving mode, it is possible to execute the processing for transition to the power saving mode according to an operation state of the MFP 1, in particular, an operation state of the CPU 2, the power supply for which is turned off when the MFP 1 transitions to the super sleep mode. Therefore, it is possible to execute, when the power supply for the CPU 2 can be turned off, the processing for transition to the super sleep mode and execute, when the CPU 2 is executing processing or is about to start processing or the power supply for the CPU 2 cannot be turned off even after the transition to the power saving mode because of setting of functions realized by the CPU 2, the processing for transition to the power saving mode in which the power supply for the CPU 2 is not turned off. Consequently, it is possible to realize highly effective power saving control without the operation and the functions of the MFP 1 being limited. If the processing for transition to the super sleep mode is promptly performed after processing executed by the CPU 2 is completed, a higher power saving effect can be obtained.

Figure 3:
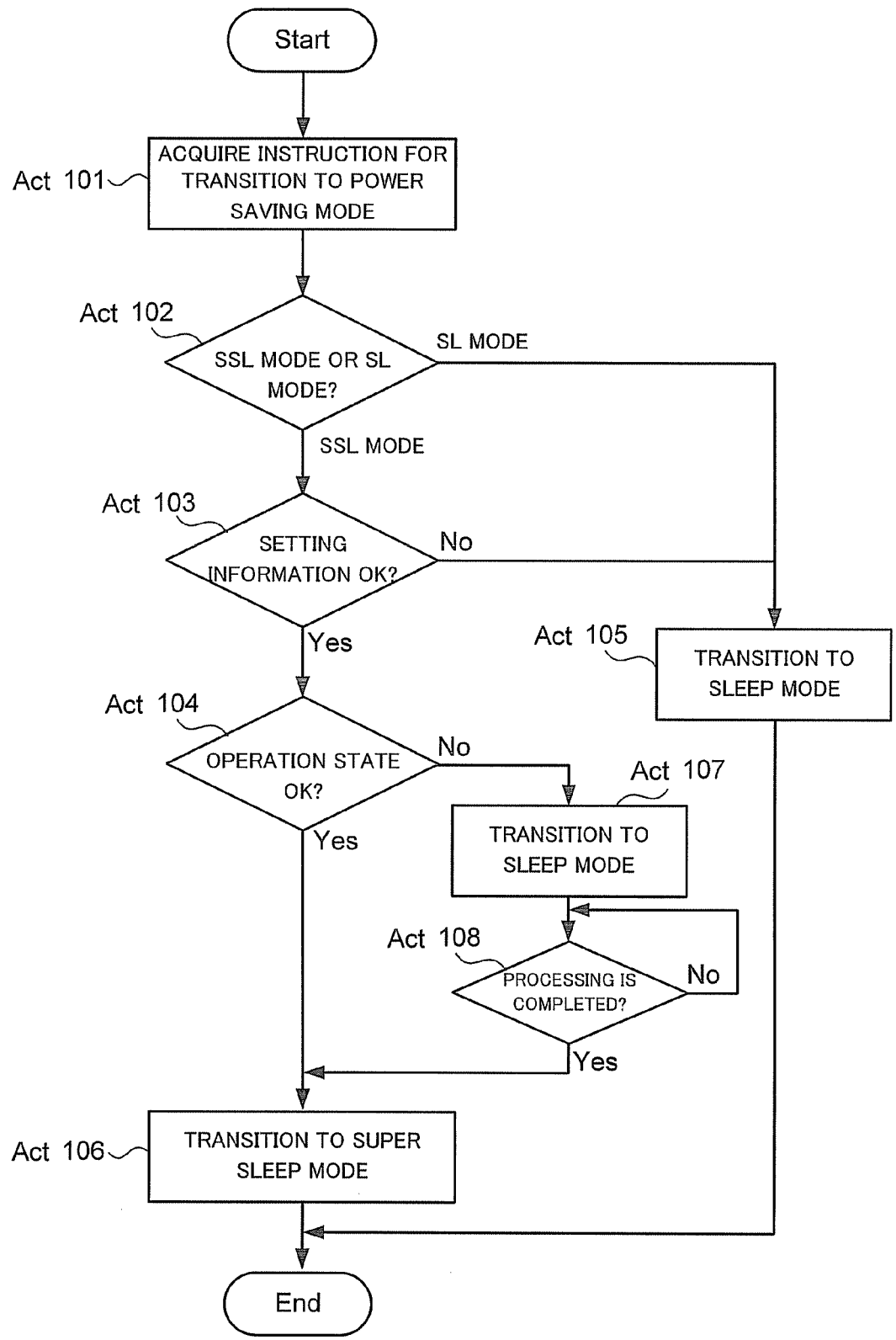
FIG. 3 is a flowchart for explaining a flow of power saving control processing by the MFP according to the first embodiment.

A flow of the power saving control processing in this embodiment is explained below. FIG. 3 is a flowchart for explaining a flow of the power saving control processing by the MFP 1 according to this embodiment. The processing for transition to the power saving mode indicated by the flowchart explained below is executed in a state in which the image forming (printing) processing is not executed in at least the image forming unit 8. This is because the power supplies for the image forming unit 8, the CPU 2, and the like cannot be turned off during the image forming processing. In the flowchart of FIG. 3, a flow of processing performed when the MFP 1 transitions to the power saving mode according to an operation input from the operation input unit 16 is explained as an example.

In Act 101, the power-saving-mode control unit 102 acquires an instruction for transition to the power saving mode according to an operation input from the operation input unit 16.

Subsequently, in Act 102, the power-saving-mode determining unit 104 acquires, from the setting-information acquiring unit 108, power saving mode setting information that indicates which of the sleep mode (SL mode) and the super sleep mode (SSL mode) is designated as the power saving mode. The power-saving-mode determining unit 104 determines to which power saving mode the MFP 1 transitions. The setting-information acquiring unit 108 acquires the power saving mode setting information from the storage device such as the memory 4 or the HDD 6.

If it is designated that the MFP 1 transitions to the super sleep mode, in Act 103, the power-saving-mode determining unit 104 determines, on the basis of active function setting information acquired from the setting-information acquiring unit 108, whether the MFP 1 can transition to the super sleep mode. When a predetermined function is always set active, the power-saving-mode determining unit 104 determines that the MFP 1 transitions to the sleep mode. The power-saving-mode control unit 102 executes the processing for transition to the sleep mode (Act 105). For example, when the Bluetooth module is mounted as the option device 20 and it is designated in the active function setting information that a function of the Bluetooth module is always activated, the CPU 2 needs to perform control of the Bluetooth module even after the power saving mode. Since the power supply for the CPU 2 cannot be turned off, the power-saving-mode determining unit 104 determines that the MFP 1 transitions to the sleep mode rather than the super sleep mode.

If the power-saving-mode determining unit 104 determines in Act 103, on the basis of the active function setting information, that the MFP 1 can transition to the super sleep mode, in Act 104, the power-saving-mode determining unit 104 determines, on the basis of operation states of the respective devices of the MFP 1 acquired from the operation-state acquiring unit 106, whether the MFP 1 can transition to the super sleep mode.

If the power-saving mode determining unit 104 determines in Act 104, from the acquired operation states, that the CPU 2 is not executing processing and the MFP 1 can transition to the super sleep mode, in Act 106, the power-saving-mode control unit 102 executes the processing for transition to the super sleep mode. Specifically, the power-saving-mode control unit 102 causes the power-supply control unit 112 to execute processing for turning off the power supply for the CPU 2 in addition to the devices, the power supplies for which are turned off in the sleep mode such as the image forming unit 8.

If, in Act 104, the CPU 2 is executing processing or is about to start processing and an operation state in which the power supply for the CPU 2 cannot be turned off is acquired, in Act 107, the power-saving-mode determining unit 104 determines that the MFP 1 transitions to the sleep mode. In this case, the power-saving-mode control unit 102 causes the power-supply control unit 112 to execute processing for turning off the power supplies for the devices, the power supplies for which are turned off in the sleep mode, including at least the image forming unit 8.

In Act 108, the power-saving-mode control unit 102 determines, according to the operation states acquired from the operation-state acquiring unit 106, whether the processing executed by the CPU 2 when the MFP 1 transitions to the power saving mode or the processing about to be executed by the CPU 2 is completed (Act 108). If the processing is completed and an operation state in which the power supply for the CPU 2 can be turned off is acquired, the power-saving-mode control unit 102 causes the power-supply control unit 112 to execute processing for turning off the power supply for the CPU 2 and transitions the MFP 1 to the super sleep mode (Act 106)

If, in Act 102, it is designated in the power saving mode setting information acquired from the setting-information acquiring unit 108 that the MFP 1 transitions to the sleep mode, the power-saving-mode determining unit 104 determines that the MFP 1 transitions to the sleep mode. The power-saving-mode control unit 102 executes the processing for transition to the sleep mode.

The flow of the power saving control processing in the MFP 1 according to this embodiment is explained above.

In the above explanation of the flowchart of FIG. 3, the determination processing of the power-saving-mode determining unit 104 is performed in the order of the determination based on the power saving mode designation information (Act 102), the determination based on the active function setting information (Act 103), and the determination based on operation states (Act 104). However, the determination processing is not limited to this and may be performed in different order or the respective kinds of processing may be performed in parallel.

As explained above, with the MFP 1 according to this embodiment, it is possible to realize a function of transitioning to the super sleep mode with a high power saving effect on the basis of, for example, an operation state of the CPU 2, presence or absence of mounting of an option device, or presence or absence of a device or a function set active even after the transition to the power saving mode without the processing and the functions of the MFP 1 being limited.

In this embodiment, it is explained that the determination for determining the power saving mode, to which the MFP 1 transitions, is performed on the basis of the power saving mode setting information, the active function setting information, and the operation states. However, the determination does not always have to be performed on the basis of all of these kinds of information. However, since it is undesirable to transition to the super sleep mode while the CPU 2 is operating, it is desirable to determine the power saving mode, to which the MFP 1 transitions, on the basis of at least an operation state of the CPU 2.

Second Embodiment

The MFP 1 according to a second embodiment of the present invention has a function of performing, when the MFP 1 transitions to the super sleep mode with the functions of the MFP 1 according to the first embodiment and acquires a signal as a trigger for releasing the super sleep mode, return processing corresponding to a type of the acquired signal. The MFP 1 according to this embodiment is explained below with reference to the drawings. However, components same as those of the MFP 1 according to the first embodiment are denoted by the same reference numerals and signs and explanation of the components is omitted.

FIG. 4 is a functional block diagram of the MFP 1 according to this embodiment. The MFP 1 according to this embodiment includes, in addition to the functions of the MFP 1 according to the first embodiment, a signal acquiring unit 402, a signal determining unit 404, a return-processing control unit 406, and a timer unit for return 408.

The signal acquiring unit 402 acquires an operation input signal from the operation input unit 16, an image forming job and other communication signals transmitted from the terminal 160 or the like and acquired via the network 150, a facsimile transmission signal, and the like.

The signal determining unit 404 determines a type of an acquired signal. Specifically, the signal determining unit 404 compares a comparison signal stored in the memory 4, a storage area provided exclusively for signal determination, or the like and the acquired signal and determines what type of a signal the signal is. As types of signals used for the determination, classification by protocols of the signals can be used. For example, when a print job signal is acquired, since the signal coincides with a protocol used for a print job (e.g., an SMB protocol or an IPP protocol), a type of the signal is specified. For a signal that are evidently received from a specific device and a type of which is evident such as the input signal from the operation input unit 16 or the facsimile reception signal, the determination in the signal determining unit 404 is not always necessary.

The return-processing control unit 406 determines, according to the signal, the type of which is specified by the signal determining unit 404, whether the return processing is performed and what kind of return processing is performed and controls the power-supply control unit 112 to execute the return processing. The return-processing control unit 406 determines, referring to a data table shown in FIG. 5 stored in the storage device such as the memory 4, whether the return processing is executed and what kind of return processing is performed. FIG. 5 is a data table 500 in which protocols that can be acquired via the network 150 and return processing designation information concerning whether super sleep is released when the protocols are acquired are associated with each other. The data table 500 includes a protocol space 502 indicating the protocols and a return processing designation space 504 indicating whether the return processing is executed when signals of the protocols are acquired. The return-processing control unit 406 determines, referring to the data table 500 and on the basis of the return processing designation information associated with a protocol of an acquired signal, whether the super sleep mode is released.

Concerning other signals that can be acquired such as an operation input signal, a table in which contents of return processing performed when the signals are acquired are associated with the signals for each of types of the signals is also provided. The return-processing control unit 406 executes the return processing referring to the table.

For example, when an acquired signal has a protocol in which the CPU 2 only has to execute processing for simply outputting some response signal to the signal and, thereafter, processing by the CPU 2, the image forming unit 8, or the like is not performed, the return-processing control unit 406 can output a signal for instructing the power-saving-mode control unit 102 to promptly transition the MFP 1 to the super sleep mode again after the processing executed by the CPU 2 is completed. Examples of such a protocol include protocols such as an ARP and an SNMP. When any one of the protocols is designated as a protocol for transitioning the MFP 1 to the super sleep mode again after processing for a signal of the protocol is completed, in the data table 500, additional information indicating that the MFP 1 is returned to the super sleep mode after the completion of the processing for the signal is registered in association with a type (the protocol) of the signal together with return processing designation information indicating that the super sleep mode is released. The return-processing control unit 406 outputs, to the power-saving-mode control unit 102, referring to the data table 500, a signal for instructing the power-saving-mode control unit 102 to execute processing for releasing the super sleep mode on the basis of the return processing designation information and execute processing for returning the MFP 1 to the super sleep mode again on the basis of the additional information after the processing of the CPU 2 is completed.

Besides, when a signal for executing processing not involving the image forming processing is acquired, it is also possible to further improve the power saving effect by registering additional information indicating that the MFP 1 is returned to the super sleep mode after the execution of the processing.

The return-processing control unit 406 can also execute, on the basis of a signal from the timer unit for return 408, the return processing for releasing the super sleep mode.

When the return-processing control unit 406 acquires some signal and returns the MFP 1 from the super sleep mode, the return-processing control unit 406 can execute return processing at various levels according to the acquired signal. For example, when processing for the acquired signal is executed only by the CPU 2, the return-processing control unit 406 executes return processing for turning on the power supply for the CPU 2. When the processing is processing requiring not only the function of the CPU 2 but also the function of the image forming unit 8 such as processing for a facsimile reception signal for executing processing for receiving a facsimile and printing the facsimile, the return-processing control unit 406 turns on the power supplies for the CPU 2 and the image forming unit 8. Further, when the processing is, like an operation input for executing copying, processing requiring to also activate other functions of the MFP 1 such as the display panel 14, the return-processing control unit 406 can execute processing for turning on the power supplies for all the devices and returning the MFP 1 to the normal operation mode. Information for designating return levels for respective types of these signals can be stored as additional information in association with the protocols. The return-processing control unit 406 can execute return processing at various return levels on the basis of the additional information.

The timer unit for return 408 outputs, to the return-processing control unit 406, when a scheduled job, execution time of which is designated, is registered, a signal for causing the return-processing control unit 406 to execute processing for turning on the power supply for the CPU 2 at the execution time of the scheduled job. Since the power supply for the CPU 2 is turned on at the execution time of the scheduled job, even if the power supply for the CPU 2 is off in the super sleep mode, the CPU 2 can execute the scheduled job at the designated time.

Functional blocks included in the MFP 1 according to this embodiment are explained above. As in the first embodiment, these functional blocks can be realized by the circuits such as the ASIC included in the power-saving control unit 100. The functional blocks may be realized by combinations of functions realized by the CPU 2 executing computer programs and the circuits. However, the signal acquiring unit 402, the signal determining unit 404, the return-processing control unit 404, and the timer unit for return 406 included in the MFP 1 according to this embodiment need to function when the power supply for the CPU 2 is off. Therefore, it is desirable that the units are realized by the circuits such as the ASIC included in the power-saving control unit 100.

With the MFP 1 including the components explained above, even when the MFP 1 transitions to the super sleep mode in which the power supply for the CPU 2 is turned off, it is possible to perform, when an image forming job, an operation input, and other signals are acquired, return processing from the power saving mode corresponding to the respective signals. Therefore, with the MFP 1 according to this embodiment, it is possible to realize a power saving mode with a high power saving effect by turning off the power supply for the CPU 2 while maintaining functions equivalent to those in the sleep mode in which the power supply for the CPU 2 is not turned off.

Figure 6:
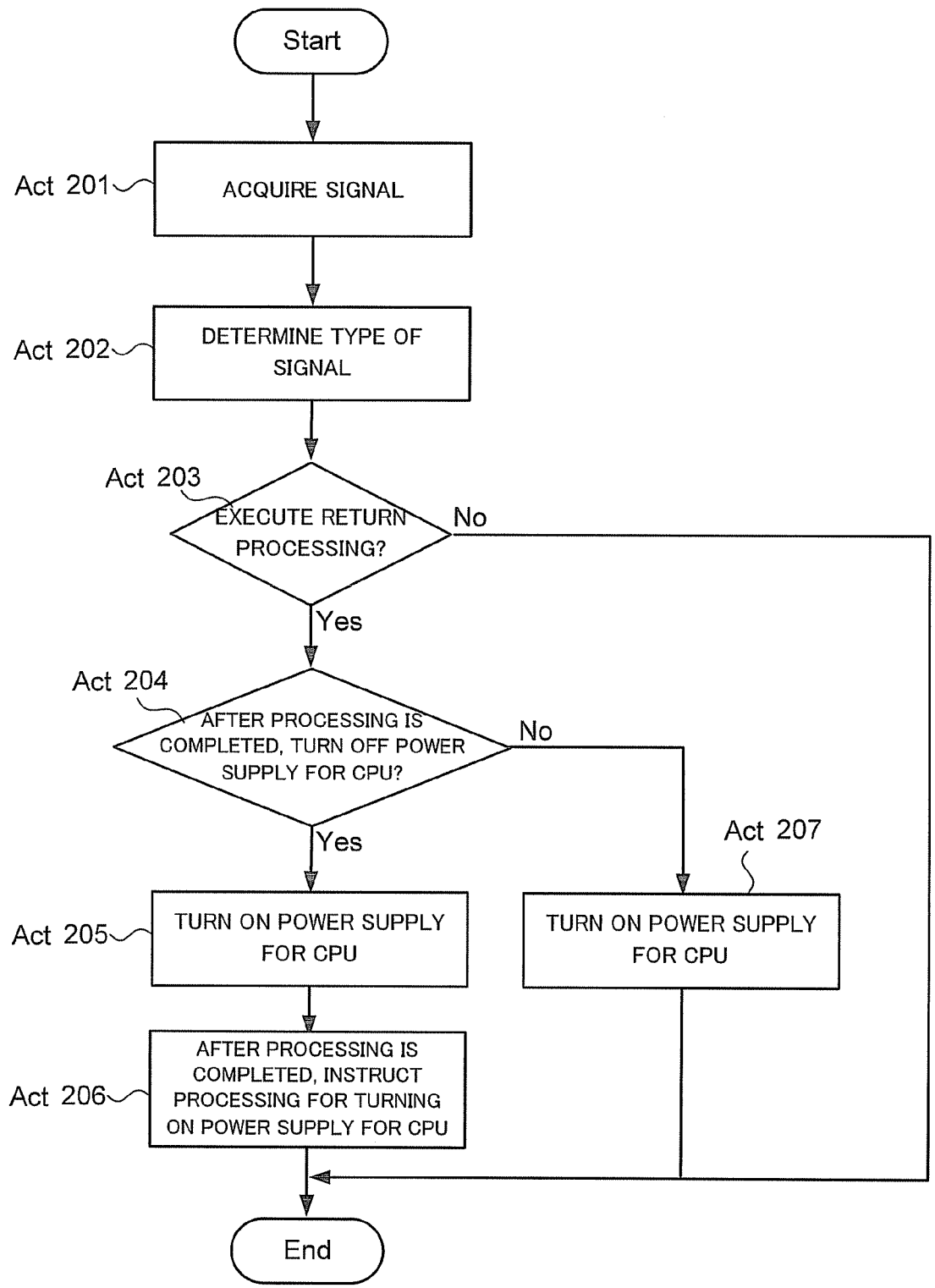
FIG. 6 is a flowchart for explaining a flow of processing performed when the MFP according to the second embodiment returns from a super sleep mode.

A flow of return processing from the super sleep mode of the MFP 1 according to this embodiment is explained. FIG. 6 is a flowchart for explaining a flow of processing performed when the MFP 1 returns from the super sleep mode on the basis of a signal acquired from the network 150, the operation input unit 16, or the like.

First, in Act 201, the signal acquiring unit 402 acquires a signal, which can be a trigger for releasing the super sleep mode, from the network 150 or the like.

Subsequently, in Act 202, the signal determining unit 404 compares the comparison signal stored in the memory 4 or the like and the acquired signal and determines a type (a protocol) of the acquired signal. As explained above, for a signal, a type of which is evident, such as a signal from the operation input unit 16, the signal determination processing does not always have to be performed.

In Act 203, the return-processing control unit 406 determines, referring to the data table 500 stored in the memory 4 or the like, whether (the protocol of) the acquired signal is designated as a signal (a protocol) for returning the MFP 1 from the super sleep mode in the return processing designation information.

If (the protocol of) the acquired signal is designated as the signal (the protocol) for returning the MFP 1 from the super sleep mode, in Act 204, the return-processing control unit 406 determines, referring to the data table 500, on the basis of additional information of the return processing designation information, whether the acquired signal is designated as a signal for executing processing for returning the MFP 1 to the super sleep mode again after the CPU 2 executes processing for the acquired signal.

If there is additional information for designating the acquired signal as the signal for returning the MFP 1 to the super sleep mode again, in Act 205, the return-processing control unit 406 causes, in order to release the super sleep mode, the power-supply control unit 112 to execute processing for turning on the power supply for the CPU 2. In Act 206, the return-processing control unit 406 outputs, to the power-saving-mode control unit 102, a signal indicating an instruction for causing the power-saving-mode control unit 102 to execute processing for turning off the power supply for the CPU 2 again and returning the MFP 1 to the super sleep mode after the processing by the CPU 2 for the acquired signal is completed.

If the return-processing control unit 406 determines in Act 204 that the acquired signal is not designated as the signal for returning the MFP 1 to the super sleep mode again, in Act 207, the return-processing control unit 406 causes, in order to release the super sleep mode, the power-supply control unit 112 to execute processing for turning on the power supply for the CPU 2.

If the return-processing control unit 406 determines in Act 203 that the acquired signal is not designated as the signal as a trigger for returning the MFP 1 from the super sleep mode in the return processing designation information, the return-processing control unit 406 maintains the super sleep mode without turning on the power supply for the CPU 2.

The flow of the return processing from the super sleep mode by the MFP 1 according to this embodiment is explained above.

In the processing for releasing the super sleep mode in Act 205 and Act 207 explained with reference to FIG. 6, as explained above, the return-processing control unit 406 can perform return processing corresponding to a return level stored as additional information.

In FIG. 6, if the return-processing control unit 406 determines in Act 204 that the processing for turning off the power supply for the CPU 2 is executed after the processing for the signal, after turning on the power supply for the CPU 2 (Act 205), the return-processing control unit 406 executes processing for outputting, to the power-supply control unit 112, a signal indicating an instruction for causing the power-supply control unit 112 to execute processing for turning off the power supply for the CPU 2 again and returning the MFP 1 to the super sleep mode after the processing by the CPU 2 for the acquired signal is completed (Act 206). However, these kinds of processing are not limited to this order and may be performed in parallel.

When the return processing is performed on the basis of a signal from the timer unit for return 408, the return-processing control unit 406 acquires a signal from the timer unit for return 408 output at designated time. The return-processing control unit 406 causes the power-supply control unit 112 to execute the processing for turning on the power supply for the CPU 2 and releasing the super sleep mode. The CPU 2, the power supply for which is turned on, thereafter executes a scheduled job at the designated time. Therefore, in the case of the return processing based on the signal from the timer unit for return 408, only the processing in Act 201 and Act 207 is executed among the kinds of processing shown in FIG. 6.

As explained above, with the MFP 1 according to this embodiment, even if the power supply for the CPU 2 is turned off, when some signal to the MFP 1 is acquired, the power supply for the CPU 2 is surely turned on and processing for the signal can be executed. Therefore, the functions and the convenience of the MFP 1 are not limited and the operation in the super sleep mode in which the power supply for the CPU 2 is turned off can be performed. Therefore, it is possible to provide a MFP having high power saving performance.

A computer program for causing the computer included in the MFP as the image forming apparatus to execute (a part of) the operations explained above can be provided as a power saving control program. In the example explained in this embodiment, (a part of) the functions for carrying out the present invention are realized by the CPU executing the computer programs stored in the memory. However, the present invention is not limited to this. A computer program for realizing these functions may be downloaded from the network to the apparatus. The same computer program stored in a computer-readable recording medium may be installed in the apparatus. A form of the recording medium may be any form as long as the recording medium is a recording medium that can store the computer program and is readable by the computer. Specifically, examples of the recording medium include internal storage devices internally mounted in the computer such as a ROM and a RAM, portable storage media such as a CD-ROM, a flexible disk, a DVD disk, a magneto-optical disk, and an IC card, a database that stores a computer program, other computers and databases for the computers, and a transmission medium on a line. The functions obtained by installation or download in advance in this way may realize the functions in cooperation with an OS (operating system) in the apparatus.

A part of the computer program or the entire computer program may be a dynamically generated execution module.

The present invention can be carried out in various forms without departing from the spirit or the main characteristics thereof. Therefore, the embodiments explained above are merely simple illustrations in every aspect and should not be limitedly interpreted. The scope of the present invention is indicated by the appended claims and is by no means limited by the text of the specification. Further, all alterations and various improvements, substitutions, and modifications belonging to the scope of equivalents of the claims are within the scope of the present invention.

As explained above in detail, according to the present invention, it is possible to provide an image forming apparatus with a higher power saving effect without functions thereof being limited.

What is claimed is:

1. An image forming apparatus comprising:
   a power-saving-mode determining unit configured to determine, on the basis of an operation state of a processor, to which power saving mode of a sleep mode in which power supply to at least a fixing device is stopped and a super sleep mode in which a power supply for the processor is turned off and power consumption is lower than that in the sleep mode the apparatus transitions, the power-saving mode determining unit performing the determination if predetermined processing is not executed for time set in advance or if an instruction for executing transition processing to a power saving mode in which power consumption is lower than that in a normal operation mode in which power supply to at least the fixing device is performed; and
   a power-saving-mode control unit configured to execute, on the basis of a determination result of the power-saving-mode determining unit, processing for transition to one power saving mode of the sleep mode and the super sleep mode.

2. The apparatus according to claim 1, wherein the power-saving-mode determining unit determines, if processing is being executed by the processor or processing is about to be executed by the processor, that the apparatus transitions to the sleep mode.

3. The apparatus according to claim 2, wherein the power-saving-mode control unit executes, if the processing executed by the processor is completed, processing for transition to the super sleep mode.

4. The apparatus according to claim 1, further comprising a setting-information acquiring unit configured to acquire, if the predetermined processing is not executed for the time set in advance or if the instruction for executing the transition processing to the power saving mode is acquired, power saving mode setting information for designating to which power saving mode of the sleep mode and the super sleep mode the apparatus transitions, wherein
   the power-saving-mode determining unit determines, on the basis of an operation state of the processor and the power saving mode setting information, to which power saving mode the apparatus transitions.

5. The apparatus according to claim 1, further comprising a setting-information acquiring unit configured to acquire active function setting information concerning whether a function that cannot be executed unless the power supply for the processor is on is activated even in a state in which the apparatus transitions to a mode in which power consumption is lower than that in the normal operation mode, wherein
   the power-saving-mode determining unit determines, on the basis of an operation state of the processor and the active function setting information, to which power saving mode the apparatus transitions.

6. The apparatus according to claim 5, wherein the active function setting information is determined on the basis of whether a radio communication device configured to perform radio communication is mounted.

7. The apparatus according to claim 1, further comprising:
a signal acquiring unit configured to acquire a signal as a trigger for releasing the super sleep mode;
a signal determining unit configured to determine a type of the signal acquired by the signal acquiring unit; and
a return-processing control unit configured to execute, on the basis of a determination result of the signal determining unit, return processing for returning, by turning on the power supply for the processor and releasing the super sleep mode, the apparatus to an operation mode in which power consumption is higher than that in the super sleep mode.

8. The apparatus according to claim 7, wherein
the signal determining unit determines whether the signal acquired by the signal acquiring unit is a signal for requesting a response signal to the acquired signal, and
the power-saving-mode control unit executes, if the signal determining unit determines that the signal acquired by the signal acquiring unit is the signal for requesting the response signal, processing for transition to the super sleep mode after the processor executes processing for outputting the response signal.

9. The apparatus according to claim 7, wherein
the signal determining unit determines whether the signal acquired by the signal acquiring unit is a signal for causing the processor to execute processing not involving image forming processing, and
the power-saving-mode control unit executes, if the signal determining unit determines that the signal acquired by the signal acquiring unit is the signal for causing the processor to execute the processing not involving the image forming processing, processing for transition to the super sleep mode after the processor executes processing for the acquired signal.

10. A power saving control method comprising:
determining, on the basis of an operation state of a processor, to which power saving mode of a sleep mode in which power supply to at least a fixing device is stopped and a super sleep mode in which a power supply for the processor is turned off and power consumption is lower than that in the sleep mode an image forming apparatus transitions, the determination being performed if predetermined processing is not executed for time set in advance or if an instruction for executing transition processing to a power saving mode in which power consumption is lower than that in a normal operation mode in which power supply to at least the fixing device is performed is received; and
executing, on the basis of a determination result of the determination, processing for transition to one power saving mode of the sleep mode and the super sleep mode.

11. The method according to claim 10, further comprising determining, if processing is being executed by the processor or processing is about to be executed by the processor, that the apparatus transitions to the sleep mode.

12. The method according to claim 11, further comprising executing, if the processing executed by the processor is completed, processing for transition to the super sleep mode.

13. The method according to claim 10, further comprising:
acquiring, if the predetermined processing is not executed for the time set in advance or if the instruction for executing the transition processing to the power saving mode is acquired, power saving mode setting information for designating to which power saving mode of the sleep mode and the super sleep mode the apparatus transitions; and
determining, on the basis of an operation state of the processor and the power saving mode setting information, to which power saving mode the apparatus transitions.

14. The method according to claim 10, further comprising acquiring active function setting information concerning whether a function that cannot be executed unless the power supply for the processor is on is activated even in a state in which the apparatus transitions to a mode in which power consumption is lower than that in the normal operation mode; and
determining, on the basis of an operation state of the processor and the active function setting information, to which power saving mode the apparatus transitions.

15. The method according to claim 14, wherein the active function setting information is determined on the basis of whether a radio communication device configured to perform radio communication is mounted.

16. The method according to claim 10, further comprising:
acquiring a signal as a trigger for releasing the super sleep mode;
determining a type of the acquired signal; and
executing, on the basis of a determination result of the determination, return processing for returning, by turning on the power supply for the processor and releasing the super sleep mode, the apparatus to an operation mode in which power consumption is higher than that in the super sleep mode.

17. The method according to claim 16, further comprising:
determining whether the acquired signal is a signal for requesting a response signal to the acquired signal, and
executing, if it is determined that the acquired signal is the signal for requesting the response signal, processing for transition to the super sleep mode after the processor executes processing for outputting the response signal.

18. The method according to claim 16, further comprising:
determining whether the acquired signal is a signal for causing the processor to execute processing not involving image forming processing, and
executing, if it is determined that the acquired signal is the signal for causing the processor to execute the processing not involving the image forming processing, processing for transition to the super sleep mode after the processor executes processing for the acquired signal.

19. A non-transitory computer-readable recording medium having recorded therein a power saving control program for causing a computer to execute processing for acquiring power saving mode setting information for designating to which power saving mode of a sleep mode in which power supply to at least the fixing device is stopped and a super sleep mode in which a power supply for a processor is turned off and power consumption is lower than that in the sleep mode an image forming apparatus transitions, the power saving control program causing the computer to execute the processing if it is determined, on the basis of an operation state of a processor, to which power saving mode of the sleep mode and the super sleep mode the image forming apparatus transitions and processing for transition to one power saving mode of the sleep mode and the super sleep mode is executed on the basis of a determination result of the determination, the determination being performed if predetermined processing is not executed for time set in advance or if an instruction for executing transition processing to a power saving mode in which power consumption is lower than that in a normal operation mode in which power supply to at least the fixing device is performed is received.

20. A non-transitory computer-readable recording medium having recorded therein a power saving control program for causing a computer to execute processing for acquiring active function setting information concerning whether a function that cannot be executed unless a power supply for a processor is on is activated even in a state in which an image forming apparatus transitions to a mode in which power consumption is lower than that in a normal operation mode in which power supply to at least a fixing device is performed, the power saving control program causing the computer to execute the processing if it is determined, on the basis of an operation state of the processor, to which power saving mode of a sleep mode in which power supply to at least the fixing device is stopped and a super sleep mode in which the power supply for the processor is turned off and power consumption is lower than that in the sleep mode an image forming apparatus transitions and processing for transition to one power saving mode of the sleep mode and the super sleep mode is executed on the basis of a determination result of the determination, the determination being performed if predetermined processing is not executed for time set in advance or if an instruction for executing transition processing to a power saving mode in which power consumption is lower than that in the normal operation mode is received.

* * * * *